United States Patent
Knyrim

(10) Patent No.: US 9,717,646 B2
(45) Date of Patent: Aug. 1, 2017

(54) CONTROL ARRANGEMENT FOR CONTROLLING THE INTENSITY OF THE MASSAGING MOTION OF A MASSAGE DEVICE AND A MASSAGE DEVICE COMPRISING A CONTROL ARRANGEMENT OF THIS TYPE

(71) Applicant: Jörg Knyrim, Karlsruhe (DE)

(72) Inventor: Jörg Knyrim, Karlsruhe (DE)

( * ) Notice: Subject to any disclaimer, the term of this patent is extended or adjusted under 35 U.S.C. 154(b) by 259 days.

(21) Appl. No.: 14/432,800

(22) PCT Filed: Oct. 2, 2013

(86) PCT No.: PCT/DE2013/100349
§ 371 (c)(1),
(2) Date: Apr. 1, 2015

(87) PCT Pub. No.: WO2014/053123
PCT Pub. Date: Apr. 10, 2014

(65) Prior Publication Data
US 2015/0245979 A1    Sep. 3, 2015

(30) Foreign Application Priority Data
Oct. 2, 2012    (DE) ........................ 10 2012 109 396

(51) Int. Cl.
*A61H 23/00*    (2006.01)
*A61H 23/02*    (2006.01)
(Continued)

(52) U.S. Cl.
CPC ......... *A61H 23/0263* (2013.01); *A61H 19/32* (2013.01); *A61H 19/34* (2013.01);
(Continued)

(58) Field of Classification Search
CPC ........ A61H 19/32; A61H 19/00; A61H 19/34; A61H 19/44; A61H 2201/50; A61H 2201/5058; A61H 23/0263
See application file for complete search history.

(56) References Cited

U.S. PATENT DOCUMENTS

2009/0306467 A1    12/2009    Sonksen et al.
2014/0046127 A1*    2/2014    Topolovac ............. A61H 19/44
                                                                600/38

FOREIGN PATENT DOCUMENTS

DE        4426446        2/1995
DE        20005475       5/2000
EP        2364687        9/2011

* cited by examiner

*Primary Examiner* — Christine H Matthews
(74) *Attorney, Agent, or Firm* — Welsh Flaxman & Gitler LLC

(57) ABSTRACT

The invention relates to a method for controlling the intensity of the massaging motion of a massage device including at least one preferably elongated massage section with at least one wall that forms the outer surface of the massage section. The massage device also has at least one first electric drive device having a first electric motor unit and at least one second drive device having a second electric motor unit, at least some sections of each unit being operatively connected either directly or indirectly to the wall in order to generate a massaging motion. A control assembly, which is connected to the electric motor units, is provided to control the intensity of the massaging motion. The current electric power consumption of at least the first electric motor unit is particularly advantageously determined periodically or continuously, the electric power consumption that has been determined is compared to at least one predefined reference power consumption and the intensity of the massaging
(Continued)

motion generated by the second electric motor unit is controlled depending on the result of said comparison.

17 Claims, 3 Drawing Sheets

(51) Int. Cl.
    *A61H 19/00*     (2006.01)
    *H02P 31/00*     (2006.01)
(52) U.S. Cl.
    CPC .............. *A61H 19/44* (2013.01); *H02P 31/00* (2013.01); *A61H 2201/50* (2013.01); *A61H 2201/5058* (2013.01)

CONTROL ARRANGEMENT FOR CONTROLLING THE INTENSITY OF THE MASSAGING MOTION OF A MASSAGE DEVICE AND A MASSAGE DEVICE COMPRISING A CONTROL ARRANGEMENT OF THIS TYPE

BACKGROUND OF THE INVENTION

1. Field of the Invention

The invention relates to a method for controlling the intensity of the massaging motion of a massage device and a control arrangement for controlling the massage device. The massage device has at least one elongated massage section with at least one wall forming the outer surface of the massage section, and at least one first electrical driving device with a first electric motor unit and at least one second driving device with a second electric motor unit. At least sections of each motor unit being in direct or indirect operative connection with the wall for the purpose of generating a massaging motion.

2. Description of the Related Art

Massage devices for sexual stimulation of a female or male sex organ or for training of the pelvic floor are sufficiently known from the prior art. In particular, massage devices that are designed to resemble a male organ and to be introduced into body cavities are known. These preferably have the shape of a rod and comprise a head portion having at least one massaging section in which a massaging motion is generated for the purpose of sexual stimulation of the female sex organ. Such massage devices further comprise at least one, preferably electrically operated, drive unit for generating the massage motion in the massaging section of the head portion.

Massage devices for sexual stimulation of the male sex organ, particularly a male penis, are also known. The purpose of such massage devices is to exert corresponding vibrations on the male organ, thereby bringing said organ to an excited state. Such massage devices preferably form an accommodation space that resembles a body cavity, the enclosing wall of which applies massaging movements to the male organ that is inserted in the accommodation space.

The massage devices often include electrically operated drive units, preferably electric motor units, which are supplied with electrical power via an energy supply unit, particularly a battery or rechargeable battery unit, provided inside the massage device. It is known that the electrical output of such a motor unit is dependent on the supply voltage and the current drain, and when a mechanical load is applied to the electric motor unit, if the supply voltage remains constant, the current drain rises, which in turn also increases the power draw. When electrical energy is converted into mechanical energy, conversion losses occur, particularly due to friction losses during this process, so that the mechanical output of an electric motor unit is always less than the electrical power supplied, the mechanical energy being determined by torque and rotating speed. The mechanical forces acting on the drive shaft of the electric motor unit during the massage process lead to an increase in electrical power draw and an increase in the current drain of the electric motor unit, with the result that, with a supply voltage that normally remains constant, the mechanical output generated diminishes, which causes the massaging motion to lose intensity, with unfavourable effect.

From European Patent Application No. EP 2 364 687 A1, a massage device for sexual stimulation of the female sex organs is known, for example, comprising a main vibrator unit and an auxiliary vibrator unit, in which the intensity of at least one of the vibrator units is adjusted according to the depth to which the massage device penetrates the human body cavity. For this purpose, a plurality of sensor elements are arranged at a distance from each other along the longitudinal axis of the rod-shaped massage device, and transmit a sensor signal when contact is detected between the wall of the massage head portion of the massage device and the surrounding body cavity. The output of one of the vibrator units equipped with an electric motor unit is controlled according to the number of sensor signals detected, that is to say the penetration depth of the massage device into the body cavity.

Based on this, it is an object of the invention to provide a method for controlling the intensity of the massaging motion of a massage device that eliminates the disadvantages of the prior art, and in particular to enable the massaging motion intensity to be controlled as a function of the mechanical force generated during the massage activity and exerted directly or indirectly on the drive shaft of the electric motor unit.

SUMMARY OF THE INVENTION

An essential aspect of the method according to the invention may be considered as being that of periodically or continuously determining the current electrical power draw of at least the first electric motor unit, comparing the electrical power draw determined with at least one predefined reference power draw, and controlling the intensity of the massaging motion created by the second electric motor unit on the basis of such comparison. With the inventive method, the intensity of the massaging motion generated by the electric motor unit is controlled particularly advantageously for a load applied to the first electric motor unit of the massage device by the user exerting pressure on the wall thereof—either by increasing the contact pressure and/or increasing the penetration depth. The user may thus particularly advantageously adapt the intensity of the massage device to the user's individual massaging needs and thus also influence the sexual stimulation of the sex organs in accordance with his/her personal requirements. The intensity of the massaging motion generated by both the first and the second electric motor units is controllable as a function of the comparison result.

In a particularly advantageous variant, the change in the electrical power draw of the first motor unit that is caused during massaging by the direct or indirect action of mechanical force on the first electric motor unit, is evaluated to determine the change in intensity of the massaging motion generated by the second electric motor unit. For example, the amplitude of a supply voltage of the second electric motor unit generated by DC voltage is increased or decreased as an operating parameter. Alternatively, the "On" to "Off" ratio of a pulse-width-modulated supply voltage of the second electric motor unit may be altered as an operating parameter.

Also advantageously, at least one operating parameter of the at least one second electric motor unit is adjusted to control the intensity of the massaging motion generated by the second electric motor unit depending on the result of comparing the determined electrical power draw with the at least one predefined reference power draw. Preferably, the supply voltage of the second electric motor unit is increased or reduced as the operating parameter, preferably using a DC voltage as the supply voltage. In a variant of the embodiment, a pulse-width-modulated supply voltage may be used, in which the ratio between "Off" and "On" times is varied to control the intensity.

In an advantageous embodiment, the intensity of motion, deformation and/or vibration of the wall that is in direct or indirect operative connection with at least the second electric motor unit are controlled as the massaging motion.

The actual electrical current drain of the first electric motor unit is advantageously calculated to determine the electrical power draw at the time. Alternatively, the effective internal resistance of the first electric motor unit or the speed of the first electric motor unit may be calculated and evaluated to determine the electrical power draw at the time. The speed of the first electric motor unit may advantageously be determined via a speed sensor unit operatively connected to the first electric motor unit. In order to determine the actual electrical power draw when the first electric motor unit is powered by means of a pulse-width-modulated supply voltage, the counter-voltage generated by the first electric motor unit may also be determined in the "Off" times and evaluated to determine the speed.

Additionally, at least the second electric motor unit may be operated in one of at least two operating modes associated with the determined electrical power draw depending on the comparison result, wherein at least one reference power draw is associated with the operating mode and adapted thereto.

If the energy supply to the massage device is in the form of a battery unit or rechargeable battery unit, the voltage drop or the voltage currently supplied by the battery unit or rechargeable battery unit may also advantageously be evaluated to determine the actual power draw of the electric motor unit.

A further object of the invention is a control arrangement designed to perform the method according to the invention, and a massage device comprising such a control arrangement.

The control arrangement advantageously comprises an amplifier circuit for controlling the intensity of the massage motion of the massage device.

Also advantageously, the control arrangement may include at least one preferably wireless data interface, for example a radio transmission interface for exchanging operating data and assuring the control on the basis of such data of the massage motion intensity of a further massaging device.

In one variant, the control arrangement includes a microcontroller unit for running a control routine for controlling the massage motion intensity of a massaging device.

In addition, refinements, advantages and application capabilities of the innovation will also become evident from the following description of exemplary embodiments and the figures. All of the features described and/or illustrated, either alone or in any combination, are fundamental constituents of the object of the invention, regardless of their summary representation in the claims or reference thereof.

DETAILED DESCRIPTION OF THE INVENTION

Figure 1:
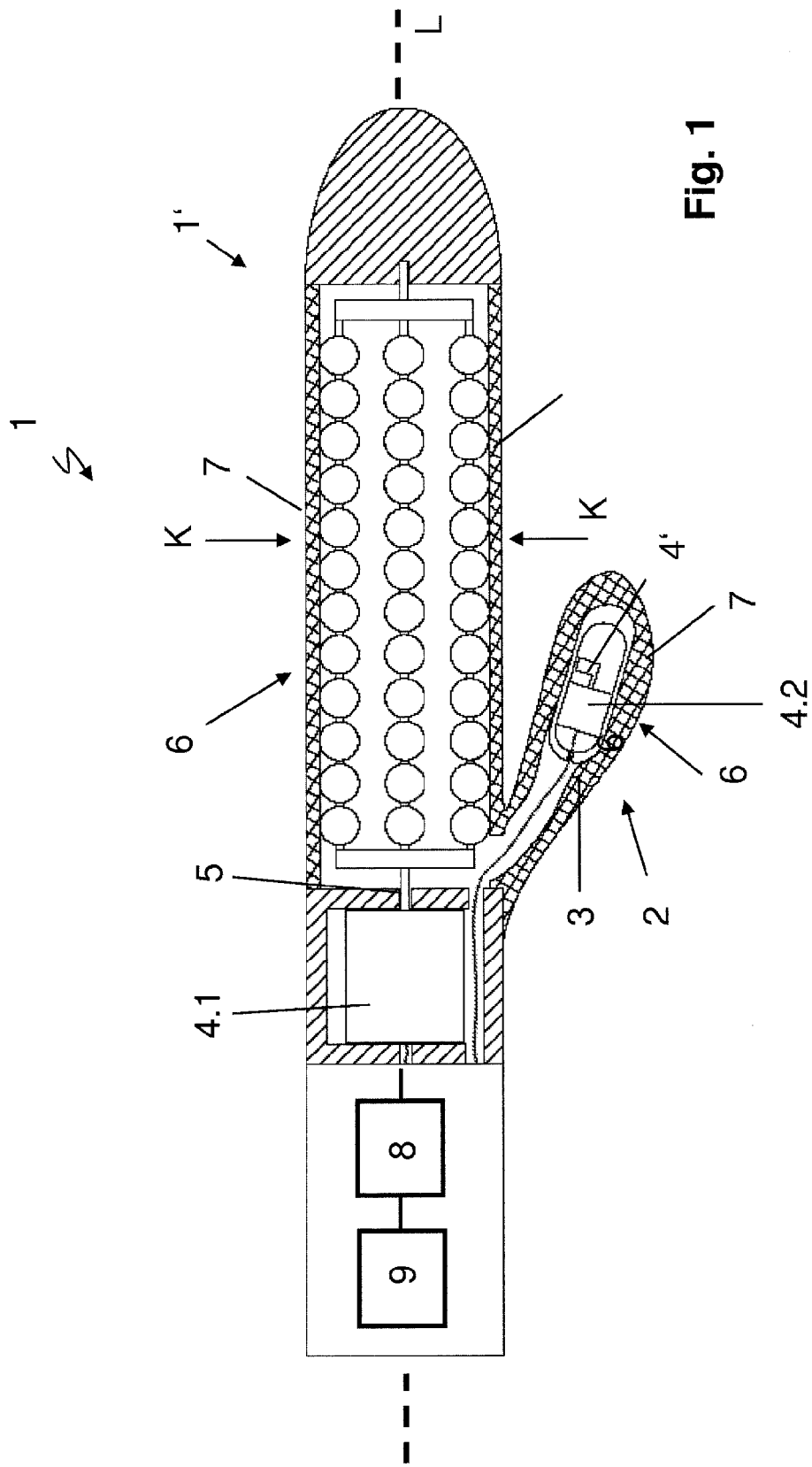
FIG. 1 shows a schematic lengthwise cross section through an exemplary, rod-like massaging device for stimulating the female sex organs with a control arrangement according to the invention.

FIG. 1 shows an exemplary rod-shaped massage device 1 having ball elements rotating about longitudinal axis L of the massage device 1, wherein the ball elements are arranged in rows along a plurality of retaining rod elements extending along longitudinal axis L. The retaining rod elements are aligned concentrically with longitudinal axis L. The rod-shaped massage device 1 is designed for introduction into body cavities, particularly for stimulating the female sex organs.

The driving device described above is driven by a first electric motor unit 4.1 around an axis of rotation extending coaxially with longitudinal axis L. The rotation of the ball elements around the axis of rotation and longitudinal axis L initiates a massaging motion in the region of the free end 1' of the massage device. The massage device 1 according to FIG. 1 further includes a vibrator unit 2 for generating an additional massage motion, particularly a vibratory motion in the region of the female clitoris. Vibration unit 2 is made up of a second electric motor unit 4.2, which is accommodated in a housing 3 and has an unbalance element 4.2'. Of course, the invention is in no way limited to this one preferred embodiment of the vibrator unit 2 as shown, and various other forms of such a vibrator unit 2 with electric motor unit 4.2 may equally well be used.

Figure 2:
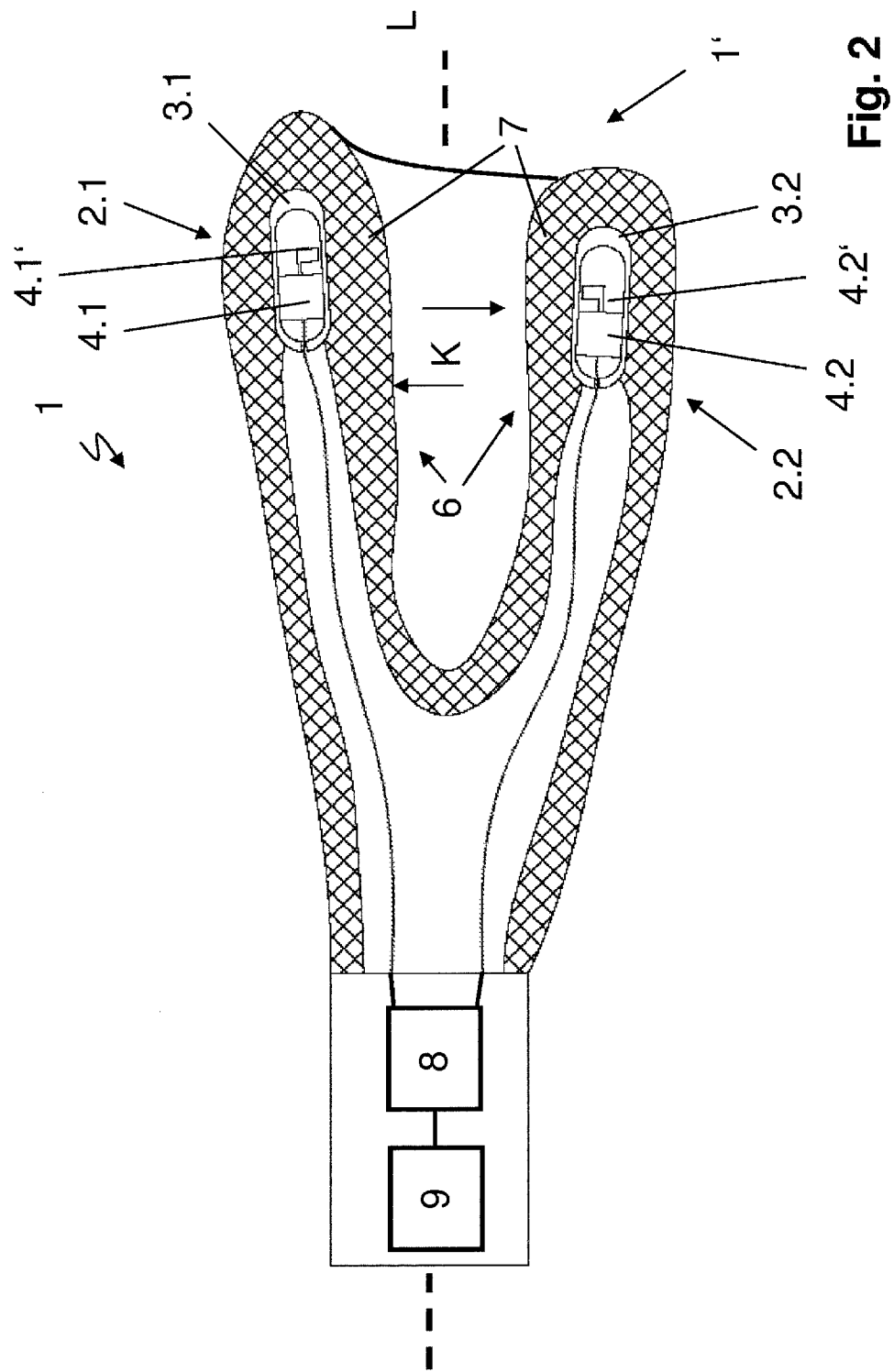
FIG. 2 shows a schematic lengthwise cross section through an exemplary massaging device for stimulating the male sex organs having a hollowed recess with a control arrangement according to the invention.

FIG. 2 shows an example of a massage device 1 for the stimulation of the male sex organ, with a first and a second vibrating unit 2.1, 2.2 for generating a massaging motion, which again comprises a first and a second electric motor unit 4.1, 4.2, each having an unbalance element 4.1', 4.2' and being accommodated in a housing 3.1, 3.2. The accommodation space in the form of a body cavity formed by massage device 1 is provided for the purpose of stimulating the male sex organ.

The common feature of the variants in FIGS. 1 and 2 is that at least one first electric motor unit 4.1 for generating a rotating motion of an unbalance element 4.1' or a drive shaft 5 is provided. The rotating motion of unbalance element 4.1' or drive shaft 5 is converted either directly or indirectly into a massaging motion, in particular also a vibrating motion of massage device 1. For this purpose, the respective massage device 1 includes at least one preferably elongated massage section 6 that comprises at least one wall 7 forming the outer surface of massage section 6. Wall 7 is made from an elastic or semi-elastic material, for example a plastic or foam material.

In order to generate the massaging motion, wall 7 is in direct or indirect operative connection with the respective vibrator unit 2, 2.1, 2.2 or with housing 3, 3.1, 3.2 of vibrator unit 2, 2.1, 2.2, or with electric motor unit 4.1, 4.2. The first and second electric motor units 4.1, 4.2 are each connected to a control arrangement 8 via electrical wires]. The control arrangement in turn is constructed with a power supply unit 9 for providing a supply voltage U which is intended to power first and second motor units 4.1, 4.2, and which is preferably controlled via control arrangement 8. In addition, display means and/or switching means might also be connected to control arrangement 8 (not shown in FIGS. 1 and 2). The display means may be designed for example as a display unit and/or lighting means such as light emitting diodes and/or speakers, which indicate the current operating state of massage device 1 and/or visually and/or audibly indicate the intensity of the massaging motion currently being output. The drive unit itself may be switched on and off. Optionally, various massage intensities and/or any of 8 massage programs made available by the control arrangement may be selected via the switching means.

Figure 3:
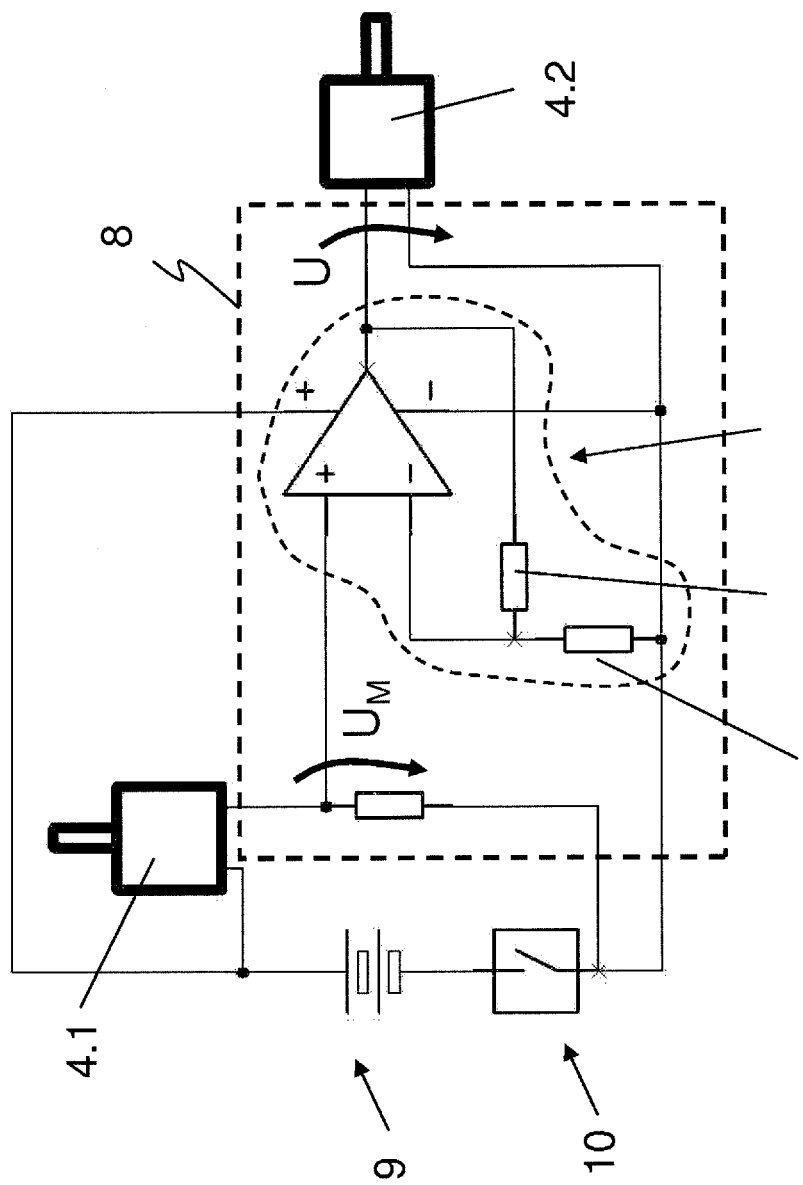
FIG. 3 shows a schematic circuit diagram of an exemplary embodiment of the control arrangement.

Depending on the complexity of the control and/or regulating tasks, control arrangement 8 consists of an electronic circuit comprising a plurality of electronic components such as at least one amplifier circuit with appropriate wiring. Optionally, a microcontroller unit may be provided with an associated, particularly integrated memory unit. FIG. 3 shows an example of a circuit diagram of one variant of control arrangement 8.

In the method, according to the invention, for controlling the intensity of the massaging motion of a massage device 1 including at least one elongated massage section 6 with at least one wall 7 that forms the outer surface of massage section 6 and at least one first electrical driving device having a first electric motor unit 4.1 and at least one second electrical driving device having a second electric motor unit 4.2, the current electrical power draw LA of the at least first electric motor unit 4.1 is determined periodically or continuously by means of control arrangement 8. The determined electric power draw LA is then compared with at least one predefined reference power draw RLA, and the intensity of the massaging motion created by second electric motor unit 4.2 is controlled on the basis thereof. The change in the electrical power draw LA of first electric motor unit 4.1 caused by the direct or indirect application of mechanical force K on first electric motor unit 4.1 during the massaging activity, is preferably evaluated in order to determine the change in intensity of the massaging motion created by second electric motor unit 4.2. The application of mechanical force K created by the user during the massaging action is indicated for exemplary purposes by arrows in FIGS. 1 and 2. This causes a change in the load on first motor unit 4.1, which in turn leads to a change in electrical power draw LA, which is evaluated for the purpose of controlling the intensity of the massaging motion generated by second electric motor unit 4.2.

Particularly preferably, in order to control the intensity of the massaging motion of massage device 1, at least one operating parameter of second electric motor unit 4.2, namely the supply voltage U for operating second electric motor unit 4.2, is changed. For example, by increasing supply voltage U to second electric motor unit 4.2, the intensity of the massaging motion of massage device 1 may be increased and adapted to current massaging needs. In the same way, a reduction of the supply voltage U causes the massaging motion to be executed with less intensity. This results in significantly improved sexual stimulation of the respective sexual organ, particularly adapted to the massaging needs of the user at the time. In a variant of the embodiment, the supply voltage may also be adjustable for both the first and the second electric motor units 4.1, 4.2.

The inventive control of the intensity of massaging motion of a massage device 1 is based principally on the change in the power balance of first electric motor unit 4.1, which may be described with formulas as follows:

$$U \times I = I \times I \times R + c \times I \times 2 \times \pi \times n \text{ or}$$

$$U = I \times R + c \times 2 \times \pi \times n \text{ where}$$

U=supply voltage in V (volts)
I=current drain in A (amperes)
R=ohmic resistance of the armature winding in Ohms
c=machine constant in Vs
n=number of revolutions per second in 1/s In this context, product U×I describes the electrical power draw LA of the first electric motor unit 4.1 and the product, wherein product I×I×R yields the electric power loss of first motor unit 4.1 and product c×I×2×π×n indicates the mechanical output provided, which itself is composed of various mechanical power losses such as friction, air resistance, etc., and of the actual mechanical power output that can be tapped. Machine constant c is a machine-specific parameter for each first electric motor unit 4.

In particular, supply voltage U consists of the counter-voltage Ui induced in electric motor unit 4.1 and the effective voltage Uw combined, wherein the effective voltage Uw corresponds to the product I×R. The induced counter-voltage Ui may thus be described with the following formula:

$$Ui = U - Uw = U - I \times R = c \times 2 \times \pi \times n$$

Accordingly, the induced counter-voltage Ui is proportional to the rotating speed n of first electric motor unit 4.1.

Thus, if resistance R of the armature winding is known, the induced counter-voltage Ui, which is directly proportional to number of revolutions n, can be determined from the current drain I and the predefined supply voltage U.

Thus, for example, the number of revolutions of first motor unit 4.1 may be determined and evaluated in order to determine the current electric power draw LA, preferably by means of an RPM sensor unit that is operatively connected to first electric motor unit 4.1, not shown in the figures, or if first electric motor unit 4.1 is powered by means of a pulse-width modulated supply voltage U by identifying and evaluating a counter-voltage generated by first electric motor unit 4 in the off-times.

In this context, depending on the embodiment variant of the massaging arrangement 1, the term massage motion is understood to be the motion, deformation and/or vibration of wall 7 that is directly or indirectly operatively connected to the respective electric motor unit 4.1, 4.2, which is controlled by the method according to the invention. In such a case, starting from a base intensity, the intensity of the massaging motion of the massaging arrangement 1 being used, generated by an electric motor unit 4.2 is raised or lowered, either incrementally or continuously, as a function of the load of the additional first electric motor unit, corresponding to the current massaging behaviour of the user. If the mechanical force application K created by the user is reduced correspondingly, the intensity of the massage motion may be reduced again by the inventive control arrangement 8.

In order to control the massage devices 1 shown in FIGS. 1 and 2, each having a first and a second electric motor unit 4.1, 4.2, control arrangement 2 is designed in such a manner. First electric motor unit 4.1 is connected to power supply unit 9 across a measuring resistor 11 via switching means 10. The actual current drain for first electric motor unit 4.1 is measured by means of measuring resistor 11 located upstream of first electric motor unit 4.1 in the form of the measurement voltage $U_M$ dropping at measuring resistor 11, and is forwarded to an amplifier circuit 12 as the input voltage. In this context, measurement voltage $U_M$ is directly proportional to the electrical output emitted by first electric motor unit 4.1.

The measurement voltage $U_m$ at the input of amplifier circuit 12 is amplified in a predetermined ratio and the voltage present at the output of amplifier circuit 12 serves as the supply voltage U for second electric motor unit 4.2. In the present embodiment, the gain is adjusted to the circuitry of operation amplifier 15 by corresponding dimensioning of the two resistors 13, 14. The present embodiment illustrates an example of a "non-inverting" amplifier circuit 12. Amplifier circuit 12 is also able to be extended, so that it is adjustable in a predefined gain range by means of a potentiometer, for example.

After massaging apparatus 1 is switched on, the first and second electric motor units 4.1, 4.2 are initially operated in a predetermined starting mode condition. Subsequently, the actual electric power draw of first electric motor unit 4.1 is determined periodically or continuously. The electric power draw is determined in accordance with FIG. 3 based on the actual measured current drain of first electric motor unit 4.1, or of the voltage drop at measuring resistor 11 caused thereby. Measurement voltage $U_m$ is increased by amplifier circuit 12 within the range defined by the circuit parameters and serves as the adapted supply voltage U for operating second electric motor unit 4.2.

According to the invention, control arrangement 8 may also include a micro-controller unit with a control routine incorporated therein, and via which it is possible to specify different operating modes of the first and/or second electric motor units 4.1, 4.2. With such operating modes, it is possible to specify the operating parameters necessary for the operation of electric motor units 4.1, 4.2, particularly the supply voltages. Of course, different massage patterns and/or predefined massage programs may also be incorporated as part of such modes, and may be stored in the memory unit and are selectable depending on the instructions of the user and/or the electrical power draw existing in each case. For example, if the output exceeds a predefined output value for a predefined time, a vibration program specially synchronised therewith and/or a special sequence of motion patterns may be generated by massage device 1. The maximum values reached during use may also be stored, for example, to document the massaging profile or training success. These can be shown to the user via the display unit.

In a further variant of the invention, the intensity of the massaging motion of a second electric motor unit, not shown in the figures, may be regulated as a function of the electric power draw of a first electric motor unit 4, particularly by altering the operating parameters of the second electric motor unit.

Also, in order to calculate the electrical power draw the effective internal resistance of first electric motor unit 4.1 may be determined, or if the first electric motor unit 4.1 is actuated by means of a pulse-width modulated supply voltage, the voltage that is induced by the first electric motor unit 4.1 may be calculated in the times when no voltage amplitude is present, and the electrical power draw of the first electric motor unit 4.1 may be determined by evaluation thereof.

A massage device 1 shown in FIG. 1, may be used for training the pelvic floor of the user, wherein the phrase pelvic floor is understood to mean the base of pelvic cavity consisting of connective tissue and muscle in humans or animals. In this context, a vibration pattern may be generated for example by second electric motor unit 4.2 of massage device 1, preferably a sequence of short-duration and longer vibration pulses similar to a Morse code. When free end 1' of massage device 1 is inserted, the user is obliged to tighten his/her pelvic floor muscles correspondingly, thereby creating a training effect of the pelvic floor musculature. It may be determined via the first electric motor unit 4.1 whether the tension executed by the user is correct according to the predetermined vibration pattern, on the basis of the inventive determination of the current electrical power draw LA from first electric motor unit 4.1 per unit of time. The training effect may be enhanced by appropriate structuring of the predefined vibration patterns, for example the duration of tensing periods may be prolonged, and the changed between short and long pulses may be varied to offer the user a greater degree of difficulty. If the user succeeds in replicating the predefined vibration pulses correctly, he/she may receive a reward in the form of a massaging motion executed by the massage device.

A remote control unit may also be provided, such a unit being connectable to control arrangement 8 either wirelessly or by wires, and via which control arrangement 8, and consequently massage device 1, may be operated remotely. Data is preferably transmitted via a wireless interface, particularly via WLAN, Bluetooth etc., for example.

Several massage devices 1 may also exchange the respective operating data, preferably via a wireless data interface, and the intensity of the massaging motion of one massage device 1 may be regulated by the operating state of the respective other massaging device using the inventive method.

If energy supply unit 9 has the form of a battery pack or a rechargeable battery pack, the voltage drop or the currently provided voltage thereof may also be evaluated to determine the current power draw LA of first electric motor unit 4.

Of course, the above-mentioned control criteria may be applied in any combination, for example the actual current drain of first electric motor unit 4.1, the effective internal resistance of first electric motor unit 4.1 might be calculated, the speed of first electric motor unit 4.1 and/or the voltage drop or the voltage currently provided by the battery pack or rechargeable battery pack might be determined and evaluated to determine the current electric power draw.

The invention has been described in the preceding with reference to an exemplary embodiment. Of course, numerous modifications and alterations of this invention are possible without exceeding the scope of the inventive thought.

LIST OF REFERENCE NUMBERS

1 Massage device
1' Free end
2, 2.1, 2.2 Vibrator unit
3, 3.1, 3.2 Housing
4.1 First electric motor unit
4.1' Unbalance element
4.2 Second electric motor unit
4.2' Unbalance element
5 Drive shaft
6 Massage section
7 Wall
8 Control arrangement
9 Power supply unit
10 Switching means
11 Measuring resistor
12 Amplifier circuit
13 Resistor
14 Resistor
15 Operating amplifiers
U Supply voltage
$U_M$ Measurement voltage
L Longitudinal axis

The invention claimed is:

1. A method for controlling an intensity of a massaging motion of a massage device comprising an elongated massage section having at least one wall forming an outer surface of the massage section, and at least one first electrical driving device with a first electric motor unit and at least one second driving device with a second electric motor unit, at least sections of each of the at least one first electrical driving device and the at least one second driving device being in direct or indirect operative connection with the at least one wall for generating a massaging motion, comprising the steps of:
controlling a control arrangement connected to the first electric motor unit and the second electric motor unit to control an intensity of the massaging motion,
periodically or continually determining a first determined current electrical power draw of at least the first electric motor unit;
comparing the determined current electrical power draw with at least one predefined reference power draw; and
controlling the intensity of the massaging motion generated by the second electric motor unit, wherein the intensity of the massaging motion of the massage device, generated by the second electric motor unit, is raised or lowered, either incrementally or continuously, as a function of a load of the first electric motor unit selected by a user and wherein an intensity of motion, deformation and/or vibration of the at least one wall is in direct or indirect operative connection with the second electric motor unit.

2. The method according to claim 1, wherein at least one operating parameter of the second electric motor unit is adjusted to control the intensity of the massaging motion generated by the second electric motor unit depending on a result of comparing the determined current electrical power draw of the first electric motor unit with the at least one predefined reference power draw.

3. The method according to claim 2, wherein an amplitude of a supply voltage generated by direct current voltage of the second electric motor unit is increased or decreased as an operating parameter.

4. The method according to claim 2, wherein an "On" to "Off" ratio of a pulse-width-modulated supply voltage of the second electric motor unit is altered as an operating parameter.

5. The method according to claim 1, wherein the intensity of motion, deformation and/or vibration of the at least one wall that is in direct or indirect operative connection with at least the second electric motor unit is controlled.

6. The method according to claim 1, wherein an actual electrical current drain of the first electric motor unit is calculated to determine the current electrical power draw.

7. The method according to claim 1, wherein an effective internal resistance of the first electric motor unit is calculated and evaluated to determine the current electrical power draw.

8. The method according to claim 1, whereby in order to determine the current electrical power draw, a speed of the first electric motor unit is determined and evaluated.

9. The method according to claim 8, wherein the speed of the first electric motor unit is determined via a speed sensor unit operatively connected to the first electric motor unit.

10. The method according to claim 8, whereby in order to determine the current electrical power draw when the first electric motor unit is powered by a pulse-width-modulated supply voltage, a counter-voltage generated by the first electric motor unit is determined in "Off" times and evaluated to determine speed.

11. The method according to claim 1, wherein the second electric motor unit is operated in an operating mode associated with a second determined current electrical power draw depending on a comparison result, wherein the least one predefined reference power draw is associated with the operating mode and adapted thereto.

12. The method according to claim 1, whereby for a power supply of the massage device, a battery unit or a rechargeable battery unit is provided, a voltage drop or a voltage currently supplied by the battery unit or the rechargeable battery unit is evaluated to determine the current electrical power draw of the first electric motor unit.

13. A control arrangement for controlling an intensity of a massaging motion of a massage device comprising an elongated massage section having at least one wall forming an outer surface of the massage section, and at least one first electrical driving device with a first electric motor unit and at least one second driving device with a second electric motor unit, at least sections of each of the at least one first electrical driving device and the at least one second driving device being in direct or indirect operative connection with the at least one wall for generating a massaging motion, wherein the control arrangement, connected to the first electric motor unit and the second electric motor unit, is for controlling an intensity of the massaging motion and wherein a determined current electrical power draw of at least the first electric motor unit is periodically or continually determined and the determined current electrical power draw is compared with at least one predefined reference power draw, and the intensity of the massaging motion, generated by the second electric motor unit, is controlled by the control arrangement wherein the intensity of the massaging motion of the massage device generated by the second electric motor unit is raised or lowered, either incrementally or continuously, as a function of a load of the first electric motor unit selected by a user and wherein an intensity of motion, deformation and/or vibration of the at least one wall is in direct or indirect operative connection with the second electric motor unit.

14. The control arrangement according to claim 13, wherein the control arrangement has an amplifier circuit for controlling the intensity of the massaging motion of the massage device.

15. The control arrangement according to claim 13, wherein the control arrangement comprises at least one wireless radio data interface for exchanging operating data and assuring control of an intensity of a massage motion of a further massaging device.

16. The control arrangement according to claim 13, wherein the control arrangement comprises a micro-controller unit for running a control routine for controlling the intensity of the massage motion of the massage device.

17. A massage device having a control arrangement for controlling an intensity of a massaging motion of the massage device comprising an elongated massage section having at least one wall forming an outer surface of the massage section, and at least one first electrical driving device with a first electric motor unit and at least one second driving device with a second electric motor unit, at least sections of each of the at least one first electrical driving device and the at least one second electrical device being in direct or indirect operative connection with the at least one wall for generating a massaging motion, wherein the control arrangement, connected to the first electric motor unit and the second electric motor unit, is for controlling the intensity of the massaging motion whereby a determined current electrical power draw of at least the first electric motor unit is periodically or continually determined and the determined current electrical power draw is compared with at least one predefined reference power draw, and the intensity of the massaging motion, generated by the second electric motor unit, is controlled by the control arrangement wherein the intensity of the massaging motion of the massage device generated by the second electric motor unit is raised or lowered, either incrementally or continuously as a function of a load of the first electric motor unit selected by a user and wherein an intensity of motion, deformation and/or vibration of the at least one wall is in direct or indirect operative connection with the second electric motor unit.

* * * * *